(12) United States Patent
Sasaki et al.

(10) Patent No.: US 7,065,282 B2
(45) Date of Patent: Jun. 20, 2006

(54) HOLDER AND STRUCTURE FOR ORGANIZING EXCESS LENGTH

(75) Inventors: Koji Sasaki, Kawasaki (JP); Jun Sakiura, Kawasaki (JP); Masahiko Saitou, Kawasaki (JP); Kenji Joko, Kawasaki (JP); Hideaki Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/991,063

(22) Filed: Nov. 17, 2004

(65) Prior Publication Data

US 2006/0045458 A1 Mar. 2, 2006

(30) Foreign Application Priority Data

Aug. 26, 2004 (JP) ............................. 2004-247276

(51) Int. Cl.
 *G02B 6/00* (2006.01)
(52) U.S. Cl. ....................... 385/135; 385/134
(58) Field of Classification Search ................ 385/134, 385/135
 See application file for complete search history.

(56) References Cited

U.S. PATENT DOCUMENTS 6,480,660 B1 * 11/2002 Reitmeier et al. .......... 385/135

FOREIGN PATENT DOCUMENTS

| JP | 02-266304 | 10/1990 |
|---|---|---|
| JP | 09-329716 | 12/1997 |
| JP | 10-020128 | 1/1998 |
| JP | 11-023856 | 1/1999 |

* cited by examiner

*Primary Examiner*—Jennifer Doan
(74) *Attorney, Agent, or Firm*—Katten Muchin Rosenman LLP

(57) ABSTRACT

In a holder and a structure for organizing excess length by winding cables and the like, an excess length organizing holder comprises a baseboard which has a rotation axis vertical to a fixed plane, and a spool which has a flange whose edge is provided with two incisions and a winding portion. The spool is rotated around the rotation axis in a state where a cable is folded by way of the winding portion and the two incisions, thereby winding the cable twofold around the winding portion. Also, an excess length organizing structure comprises a door detachable from a box-shaped rack, a mounting hardware connecting the door to the rack and pivoting on one side so as to make the door openable and closable, and at least one excess length organizing holder mentioned above whose baseboard is attached on a surface of the door when the door is attached to the mounting hardware.

10 Claims, 4 Drawing Sheets

HOLDER AND STRUCTURE FOR ORGANIZING EXCESS LENGTH

BACKGROUND OF THE INVENTION

1. Field of the Invention

The present invention relates to a holder and a structure for organizing excess length of cables and the like, and in particular to a holder and a structure for organizing excess length by winding cables and the like.

2. Description of the Related Art

In recent years, together with increased high-density mounting of devices (packages) with respect to transmission devices installed in station premises, areas for accommodating cables within a rack where the devices are stored are physically running short. For example, even in the absence of a problem of a circuitry function, restrictions on the number of devices mounted within a rack may be unavoidably required in some cases since cables cannot be accommodated due to a shortage of area within the rack.

It is to be noted that, in the following description, although a 2-core or 8-core optical code included in optical cables is mentioned as a specific example of a cable requiring excess length organizing in a rack of transmission devices, cables that can be organized or arranged are not limited to optical codes but include general types of cables such as metal cables (electric cables), and optical cables.

FIGS. 4A and 4B show an example of a conventional cable wiring structure within a rack. FIG. 4A shows a perspective view of a rack 100 partially showing the interior of the rack 100 in a state where a door 110 on the observer's left is shown as being open. As shown, a rack pillar 101 is provided to the rear of the inner surface of a rack side 102, and a holder 104 is fixed to the rack pillar 101. Also, the rack 100 is provided with a unit 103 for mounting a device 40.

An optical code 20 and a metal cable 30 drawn into the rack 100 within station premises from the outside of the station premises are respectively connected to the device 40. The length of the metal cable 30 can be adjusted by cutting if necessary. However, the light code 20 is obtained by removing a sheath of an optical cable (not shown) immediately before being drawn into the rack 100, and is usually cut up to a uniform length that reaches the device 40 mounted on the unit 103 at a highest position considering the height of the rack 100. Accordingly, it is general to organize an excess length by winding the optical code 20 around the holder 104 as required, thereby adjusting the length.

It is to be noted that in the following description, unless otherwise specified, the optical code 20, the metal cable 30, and the device 40 include a plurality of optical codes, metal cables, and devices.

FIG. 4B shows a sectional view along a line A–A' of FIG. 4A showing a positional relationship between the rack pillar 101, the rack side 102, the unit 103, the holder 104, and the door 110. However, FIG. 4A shows a state where the door 110 is open, while FIG. 4B shows a state where the door 110 is closed.

An optical code area P shown in FIG. 4B is an area for accommodating the code 20. A metal code area Q is an area for accommodating the metal code 30. Also, a work area X for organizing optical code's excess length is a work area when an excess length organizing operation is performed by winding the optical code 20 around the holder 104. An organizing area Y of optical code's excess length is an area occupied by the optical code 20 wound around the holder 104.

Among these, the work area X for organizing optical code's excess length is an area required only when the excess length organizing operation is performed. However, since the holder 104 is fixed to the rack pillar 101, the work area X for organizing optical code's excess length always occupies a fixed area within the rack 100 as a result.

Apart from the rack 100 shown in FIGS. 4A and 4B, as an example of a device rack accommodating an optical fiber cable by organizing the excess length thereof, there is one that organizes the excess length by winding the optical fiber cable around a spool on a one-by-one basis, and fixes the spool on a supporting plate on a side surface to the front of the device rack, thereby allocating and accommodating the optical fiber cable (see e.g. patent document 1).

Another example is an optical cable connecting box. A cabinet having a cable fixing portion and a floor cable fixing portion is freely openably and closably provided with a door. The inside wall surface of the cabinet is equipped with a plurality of optical cable guides. Adapter guides are freely insertably and removably provided with adapter plates having a plurality of adapters connected to core wire ends branched from a trunk cable. An optical fiber tape core wire connected to a cable introduced from the cable fixing portion is branched via a single core separating portion to single core fibers. Termination wiring materials of conversion core wires having SC plugs or MPO plugs are connected to the other ends of the respective single core wires. In addition, the plugs are freely attachably and detachably connected to the adapters (see e.g. patent document 2).

Yet another example is an optical connecting box housing optical connectors for connecting optical fibers to other optical fibers and excess length storing portions for storing the excess length portions of the optical fibers in a box body of the optical connecting box. The box body has a main box body provided with an aperture and doors disposed at the main box body so as to make the aperture freely openable and closable. The excess length storing portions are provided on the inner side of at least one of the doors (see e.g. patent document 3).

[Patent document 1] Japanese patent application laid-open No. 11-23856

[Patent document 2] Japanese patent application laid-open No. 9-329716

[Patent document 3] Japanese patent application laid-open No. 10-20218

For example, as the number of ports increases in an IPoverSDH supporting device or the like, concerns have risen for mixing of metal cables (electric cables) on a LAN side and optical codes and the like on an SDH side. Specifically, when a device-accommodating rate increases, cable wirings become complicated.

Therefore, when a fault occurs in any one of the optical codes 20 in the rack 100 as shown in FIGS. 4A and 4B, it is difficult to identify the optical code 20 requiring treatment. Even if it can be identified, removing only one optical code 20 from the holder 104 separately from the other optical codes 20 is difficult. Therefore, in the worst case, there is no choice but to cut the optical code 20 requiring treatment. In this case, the normal optical codes 20 are not cut but only the optical code 20 requiring treatment is cut and a new optical code 20 is connected.

As the optical codes 20 increase in number, not only the excess length organizing operation itself becomes complicated but also the maintenance operation becomes more complicated as mentioned above.

Moreover, in order to enable more devices to be mounted inside a limited rack, it is desirable to secure a larger cable area so that more cables can be accommodated.

SUMMARY OF THE INVENTION

It is accordingly an object of the present invention to facilitate excess length organizing operation and to enable space saving of an excess length organizing structure in a holder and a structure for organizing excess length by winding cables and the like.

In order to achieve the above-mentioned object, an excess length organizing holder according to the present invention comprises: a baseboard which has a rotation axis vertical to a fixed plane; and a spool which has a flange whose edge is provided with two incisions and a winding portion, and rotates around the rotation axis in a state where a cable is folded by way of the winding portion and the two incisions, thereby winding the cable twofold around the winding portion.

Namely, by composing an excess length organizing (arranging) holder with a baseboard which has a rotation axis vertical to a fixed plane, and a spool which has a flange whose edge is provided with two incisions and a winding portion. By rotating the spool around the rotation axis in a state where a cable is folded by way of the winding portion and the two incisions, the cable is wound twofold around the winding portion.

Thus, a folded portion of the cable is fixed by the flange and the winding portion, so that the cable can be wound twofold by a simple operation of rotating the spool around the rotation axis on the baseboard, thereby facilitating the excess length organizing operation. Also, since the cable can be wound from roughly the center thereof, the excess length organizing operation can be performed easily even if both ends of the cable are fixed.

Also, the above-mentioned excess length organizing holder may have a guide channel provided on a surface of the flange so as to connect the two incisions.

Thus, the cable can be kept from protruding beyond the surface of the flange.

Also, the above-mentioned guide channel may be curved so that in combination with the winding portion, equal to or more than a predetermined bend radius is maintained for the cable as folded.

Namely, the perimeter of the winding portion has a radius equal to or more than a predetermined bend radius, and the guide channel is provided so as to delineate, for example, a sigmoid or reverse sigmoid curve that maintains equal to or more than a predetermined bend radius.

Thus, by merely inserting the cable along the guide channel, equal to or more than a predetermined bend radius can be maintained, so that it becomes possible to facilitate operation of organizing an excess length of cable, such as an optical code, requiring maintenance of the predetermined minimum bend radius in order to avoid deteriorations of an optical characteristic.

Also, the above-mentioned excess length organizing holder may further comprise anti-reverse rotation means which stop a rotation in a reverse direction to a winding direction of the spool.

The above-mentioned anti-reverse rotation means may comprise a salient rotation stopper provided on one of contacting surfaces between the spool and the baseboard and a rotation stopper catching slot provided on the other surface.

Namely, the anti-reverse rotation means generate frictions of rotating surfaces by the combination of a salient rotation stopper and a rotation stopper catching slot, thereby stopping the rotation in the reverse direction to a winding direction of the spool. Either of the contacting surfaces between the spool and the baseboard may be provided with the rotation stopper, while the other may be provided with the catching slot.

Thus, the rotation in the reverse direction to the winding direction of the spool can be stopped by a simple structure.

Also, the above-mentioned baseboard may be provided with fixing means which fix the baseboard to a desired fixing position.

Namely, the excess length organizing holder can be fixed to a desired fixing position by providing the baseboard with fixing means such as screw holes.

Also, an excess length organizing holder according to the present invention may comprise a multistage excess length organizing holder having a plurality of the above-mentioned excess length organizing holders, one of the excess length organizing holders being made a primary holder, and the other excess length organizing holders being made extension holders, whereby at least one of the extension holders is connected to the primary holder with connecting means so that the rotation axes of the extension holders are fixed on a same axis as the rotation axis of the primary holder.

Thus, by connecting the above-mentioned excess length organizing holders in multistage, excess length organizing operations can be performed independently per spool corresponding to each of the baseboards for a plurality of cables, and the excess length organizing operation of a plurality of cables is facilitated.

Also, the above-mentioned connecting means may comprise a combination of a ridged axis provided on each of the baseboards and a slotted bearing that fits the ridged axis.

Namely, the above-mentioned connecting means fixedly connect the adjoining primary holder and the extension holder or adjoining extension holders by the combination of a ridged axis provided on each of the baseboards and a slotted bearing that fits the ridged axis.

Also, the above-mentioned baseboard of the primary holder may have fixing means which fix the baseboard to a desired fixing position.

Namely, the primary holder can be fixed to a desired fixing position by providing the baseboard of the primary holder with fixing means such as screw holes, thereby enabling the multistage excess length organizing holder to be fixed.

Also, in order to achieve the above-mentioned object, an excess length organizing structure according to the present invention comprises: a door detachable from a box-shaped rack; a mounting hardware which connects the door to the rack and pivots on one side so as to make the door openable and closable; and at least one excess length organizing holder mentioned above whose baseboard is attached on a surface of the door when the door is attached to the mounting hardware.

Namely, in an excess length organizing structure provided with a door detachable from a box-shaped rack and a mounting hardware which connects the door to the rack and pivots on one side so as to make the door openable and closable, the mounting hardware is provided with at least one excess length organizing holder mentioned above whose baseboard is attached on a surface of the door when the door is attached to the mounting hardware.

Thus, when the excess length organizing is performed, the door can be removed and the above-mentioned mounting hardware can be rotated to an arbitrary position, so that a work area for organizing excess length, that is required only during an excess length organizing operation, can be widely secured outside of the rack, thereby improving workability. Also, it becomes possible to provide for space saving since conventionally required securing of a work area for organizing excess length inside the rack is eliminated.

Also, since an organizing area of excess length is provided on the door side of the rack, a cable area within the rack is widened.

Moreover, since the above-mentioned excess length organizing holder is used, the excess length can be organized more easily.

In the above-mentioned excess length organizing structure, the door may have a rail and a projection, and the mounting hardware may have a rail groove fitting the rail and a slantly formed depressed groove enabling the projection to slide, so that the door may be attached to the rack by sliding down the projection slantly along the depressed groove.

Namely, by sliding the projection provided on the door slantly along the depressed groove of the mounting hardware and fitting the rail provided on the door and the rail groove provided on the mounting hardware, the door is easily attached to the rack using the gravity of the door.

Contrarily, when being detached, the door has only to be lifted so as to slide the projection provided on the door slantly along the depressed groove of the mounting hardware.

Thus, easy attachments and detachments of the door are enabled by a simple structure.

BRIEF DESCRIPTION OF THE DRAWINGS

The above and other objects and advantages of the invention will be apparent upon consideration of the following detailed description, taken in conjunction with the involving drawings, in which the reference numerals refer to like parts throughout and in which.

DESCRIPTION OF THE EMBODIMENTS

Embodiments of Excess Length Organizing Holders

Figure 1A:
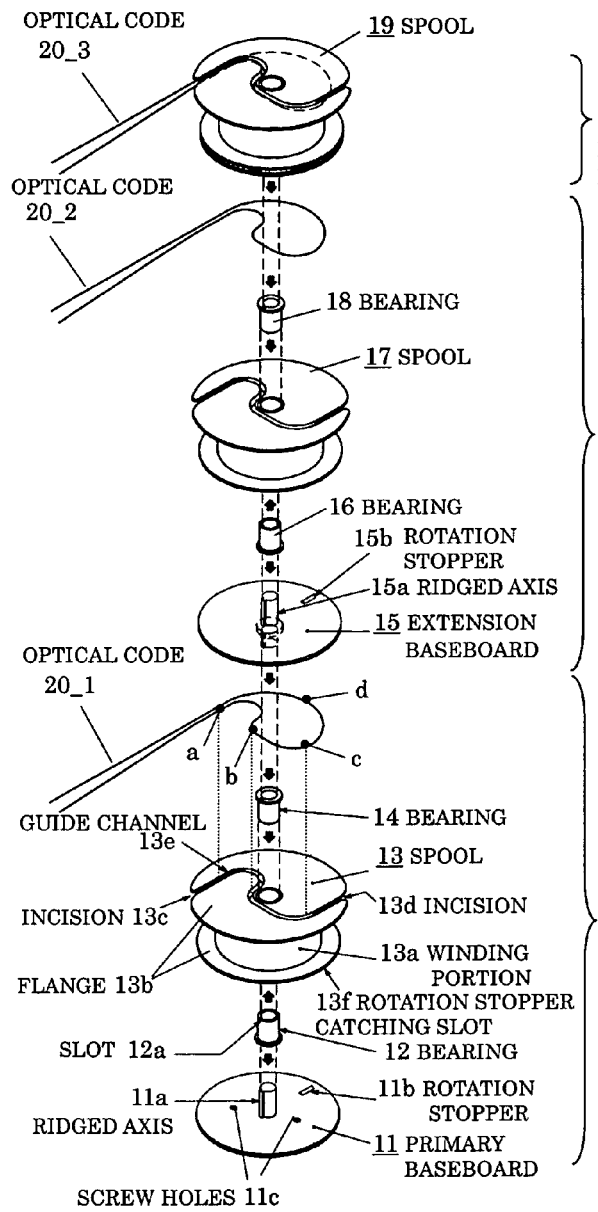
FIGS. 1A, 1B and 1C are diagrams showing embodiments of excess length organizing holders according to the present invention.
Figure 1B:
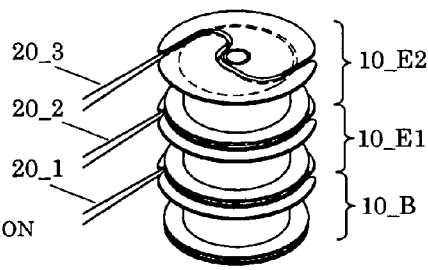
Figure 1C:
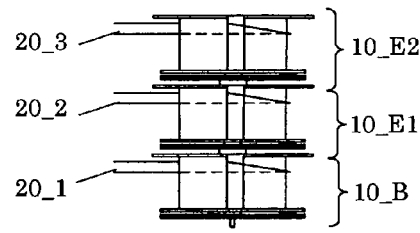

FIGS. 1A–1C show excess length organizing holders used for organizing excess length of optical codes as embodiments of excess length organizing holders according to the present invention. FIG. 1A shows a primary holder 10_B as well as extension holders 10_E1 and 10_E2 respectively winding optical codes 20_1–20_3. Among these, the primary holder 10_B and the extension holder 10_E1 are shown in states before assembling respective components, while the extension holder 10_E2 is shown in a state after assembling.

Also, FIGS. 1B and 1C respectively show a perspective view and a sectional view of a multistage excess length organizing holder in which the extension holders 10_E1 and 10_E2 are piled on the primary holder 10_B shown in FIG. 1A.

As shown in FIG. 1A, the primary holder 10_B is composed so that a bearing 12, a spool 13, and a bearing 14 are placed over a primary baseboard 11. Among these, the primary baseboard 11 is provided with a ridged axis 11a, a rotation stopper 11b, and screw holes 11c.

The cylindrical bearing 12 has a slot or a fitting groove 12a which fits into the ridged axis 11a of the primary baseboard 11 to be fixed. Also, the spool 13 that rotates around the bearing 12 is shaped so as to sandwich both sides of a winding portion 13a with flanges 13b. As shown, on one of the flanges 13b, two incisions 13c and 13d are provided inwardly from the edge thereof, and a guide channel 13e drawing a reverse sigmoid curve is provided so as to connect to the incisions 13c and 13d.

It is to be noted that when an excess length of an optical code is organized, the curve of the guide channel 13e is supposed to maintain a radius of equal to or more than R30 mm that is the minimum bend radius. Also, the radius of the outer perimeter of the winding portion 13a is supposed to be equal to or more than R30 mm.

When the optical code 20_1 is wound around the primary holder 10_B, points "a"–"c" of the code 20_1 are inserted so as to be located respectively at the incision 13c, the guide channel 13e, and the incision 13d, so that a point "d" is located on a winding surface of the winding portion 13a.

Thus, the optical code 20_1 is folded between the points "a"–"d", and fixed by the incisions 13c and 13d and the winding portion 13a. By rotating the spool 13 with this part made a start of the winding, the code 20_1 can be wound twofold.

The bearing 14 has a shape nearly identical to the bearing 12. When it is placed over the spool 13 as shown, a slot (fitting groove not shown) provided inside fits into the ridged axis 11a of the primary baseboard 11 to be fixed.

It is supposed that when the bearing 12, the spool 13, and the bearing 14 are attached to the primary baseboard 11, the tip of the ridged axis 11a reaches midway in the bearing 14, so that a margin at the upper portion of the bearing 14 is left for a ridged axis 15a of an extension holder 15 to fit as will be described later.

The extension holder 10_E1 substitutes the primary baseboard 11 of the primary holder 10_B with an extension baseboard 15. The extension baseboard 15 has the ridged axis 15a and a rotation stopper 15b similar to the primary baseboard 11. However, it does not have screw holes 11c and the ridged axis 15a protrudes from the back side of the extension baseboard 15, different from the primary baseboard 11.

A bearing 16, a spool 17, and a bearing 18 are fitted in this order on the extension baseboard 15. The spool 17 has a shape similar to that of the spool 13. Therefore, the optical code 20_2 can be wound around the spool 17 in the same way as the case of winding the optical code 20_1 around the spool 13.

The extension holder 10_E2 shown in FIG. 1A indicates a shape of an extension holder after assembling, namely indicates a state where the optical code 20_3 is wound around a spool 19. The disassembled components are the same as those of the extension holder 10_E1. It is to be noted that although the shape of the primary holder 10_B after assembling is externally the same as that of the extension holder 10_E2 shown in FIG. 1A, the ridged axis 11a is fixed only on the top face since the primary holder 10_B is to be fixed to an arbitrary mounting surface (not shown) by using the screw holes 11c.

By placing the extension holders 10_E and 10_E2 in this order over the primary holder 10_B of FIG. 1A, a multistage (triple-stage in the case shown) excess length organizing holder as shown in FIG. 1B can be obtained. In this case, the ridged axis 15a protruding from the back side (downside) of the extension baseboard 15 of the extension holder 10_E1 in FIG. 1A is fitted into the bearing 14 of the primary holder 10_B to be fixed, and the extension holder 10_E2 is similarly fitted into the bearing 18 of the extension holder 10_E1 to be fixed.

Therefore, the respective spools 13, 17, and 19 of the primary holder 10_B as well as the extension holders 10_E1 and 10_E2 can respectively and independently rotate around the ridged axes 11a and 15a through the bearings 12, 14, 16, and 18.

Also, the rotation in the reverse direction to the winding direction of the spool 13 can be stopped by the rotation stopper 11b on the primary baseboard 11 and the rotation stopper catching slot 13f provided on the back side of the flange 13b of the spool 13. As for the extension holders 10_E1 and 10_E2, similar arrangements enable the rotations in the reverse directions to respective winding directions of the spools 17 and 19 to be stopped.

It is supposed that more than one rotation stopper catching slot 13f is provided on the circumference corresponding to the rotation stopper 11b on the surface of the flange 13b.

The guide channel 13e is provided in order to prevent the optical code 20_1 from protruding beyond the surface of the flange 13b, and to maintain equal to or more than the minimum bend radius (R30 mm) for the optical code 20_1. However, the guide channel 13e is not mandatory when an excess length of cable irrespective of the minimum bend radius is organized.

FIG. 1C shows a vertical-sectional view of FIG. 1B where the optical codes 20_1–20_3 are wound respectively independent of one another.

Embodiment of Excess Length Organizing Structure

Figure 2:
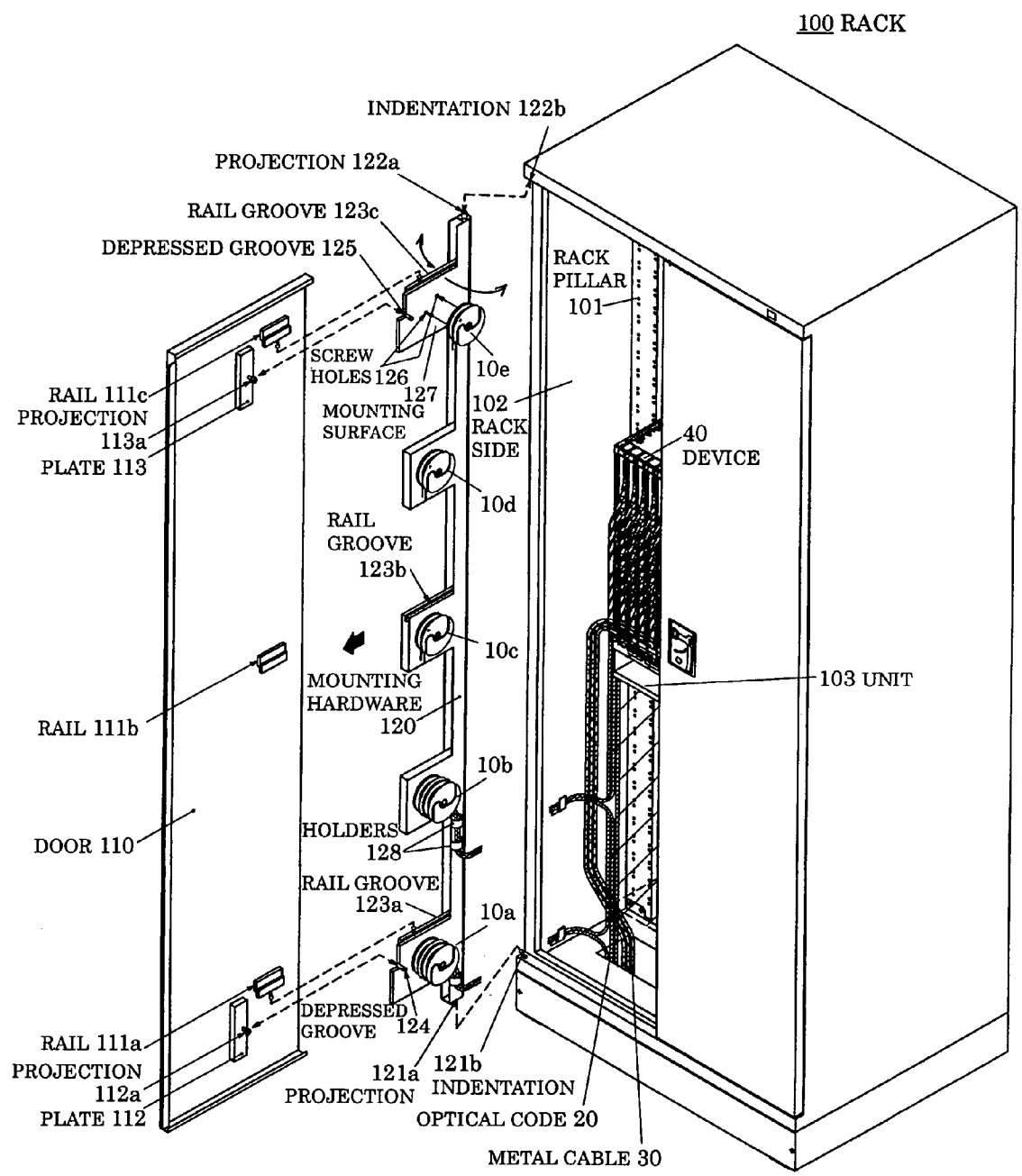
FIG. 2 is a diagram showing an exploded perspective view of an embodiment of an excess length organizing structure according to the present invention.

FIG. 2 shows a perspective view of an excess length organizing structure in a rack 100 of a transmission device as an embodiment of an excess length organizing structure of the present invention, wherein a portion related to the excess length organizing structure are disassembled to be shown.

Figure 4A:
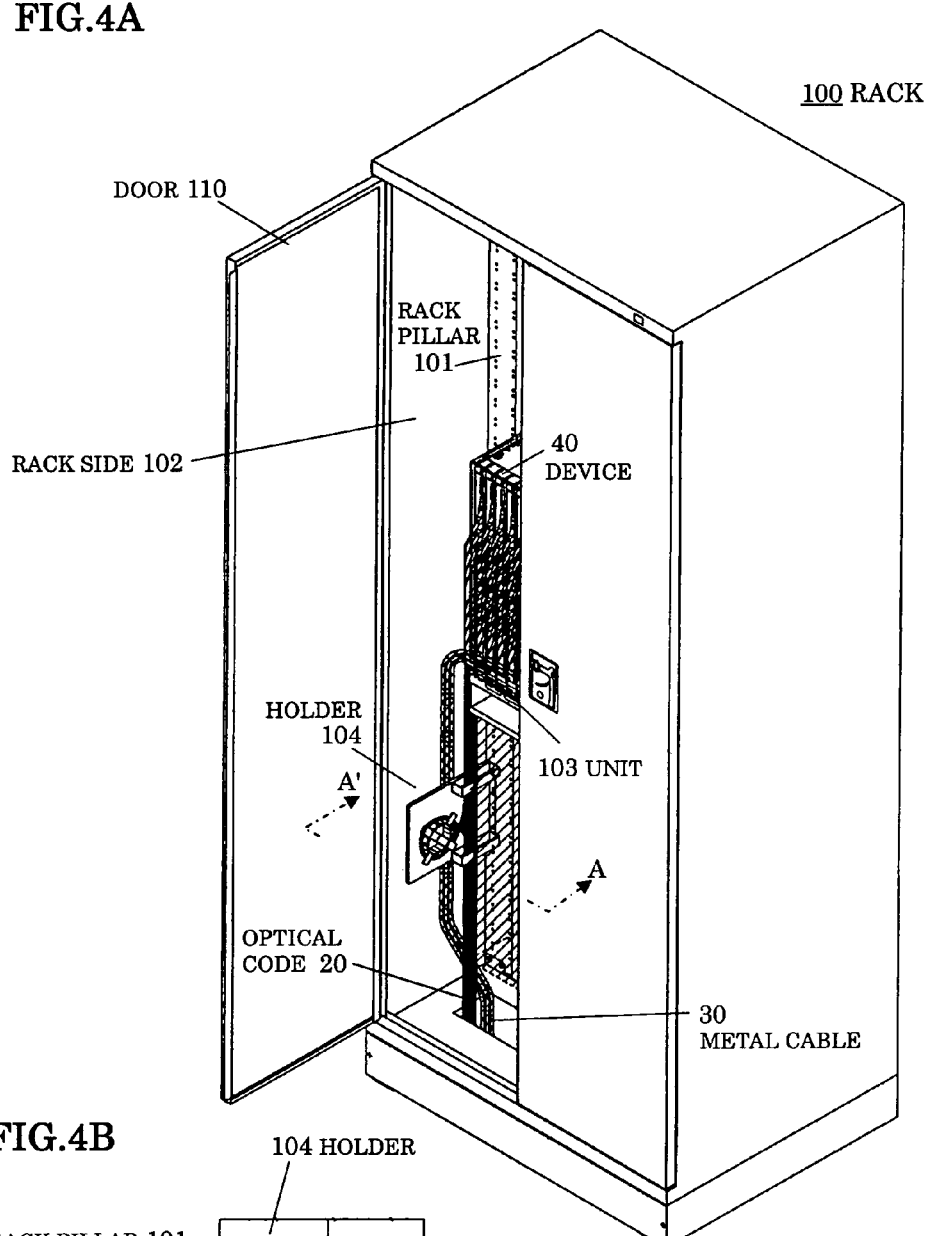
FIGS. 4A and 4B are diagrams illustrating a prior art excess length organizing structure.
Figure 4B:
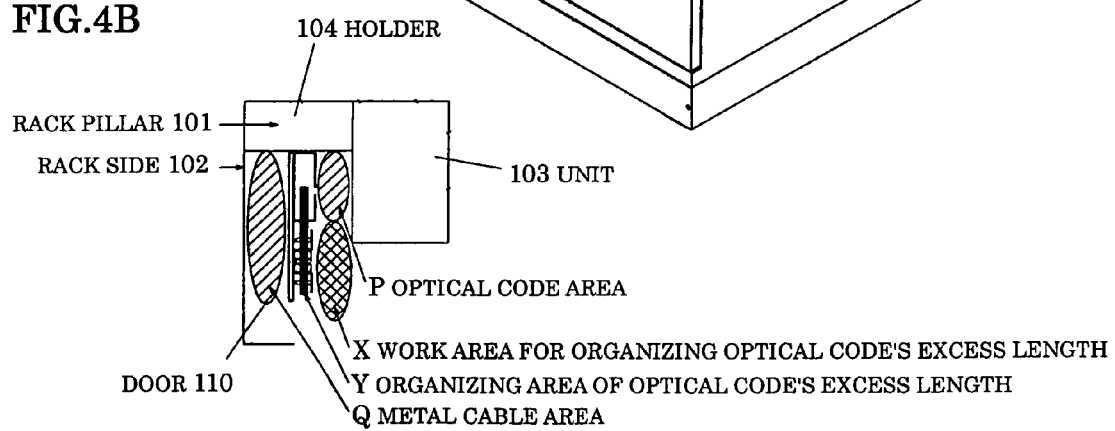

The rack 100 has a rack pillar 101, a rack side 102, and a door 110 in the same way as those of the prior art shown in FIG. 4A. An optical code 20 and a metal cable 30 drawn into the rack 100 are to be connected to a device 40 mounted on a unit 103.

Among these, excess length organizing holders 10a–10e for organizing the excess length of the optical code 20 are fixed to a mounting hardware 120 as shown in FIG. 2. The excess length organizing holders 10a and 10b are double-stage excess length organizing holders in which the primary holder 10_B and the extension holder 10_E1 are connected. The excess length organizing holders 10c–10e are excess length organizing holders composed of only the primary holder 10_B.

It is to be noted that the number of stages for piling the excess length organizing holders can be changed as required considering the strength of raw materials and the like.

It is to be noted that while a state before the excess length organizing holder 10e is fixed to the mounting hardware 120 is shown, the excess length organizing holder 10e is fixed to the mounting hardware 120 by aligning screw holes 126 with the screw holes 11c of the primary baseboard 11 and screwing on a mounting surface 127.

It is to be noted that on the mounting hardware 120, rail grooves 123a–123c are provided at three portions, and depressed (concave) grooves 124 and 125 are provided at two portions as shown in FIG. 2. Correspondingly, rails 111a–111c, and plates 112 and 113 having projections (convexities) 112a and 113a respectively are provided on the door 110.

It is to be noted that the depressed grooves 124 and 125 of the mounting hardware 120 are slantly cut in as shown in FIG. 2, so that by sliding the projections 112a and 113a to be fitted thereto, the rails 111a–111c of the door 110 and the rail grooves 123a–123c of the mounting hardware 120 are respectively fitted with one another, so that the door 110 is fixed to the mounting hardware 120. When the door 110 is detached from the mounting hardware 120, the door 110 has only to be lifted slantly along the depressed grooves 124 and 125 of the mounting hardware 120. Thus, the door 110 can be easily attached/detached to/from the mounting hardware 120.

The mounting hardware 120 is attached to the rack 100 by inserting projections (convexities) 121a and 122a respectively to indentations (concavities) 121b and 122b as shown in FIG. 2. Although FIG. 2 shows the state before being attached, the mounting hardware 120 after being attached to the rack 100 can freely rotate in the same way as the opening and closing of the door 110. It is to be noted that unlike the door 110 detached when the excess length organizing operation is performed, the mounting hardware 120 having been attached once to the rack 100 is not usually detached therefrom.

When the excess length is organized, the optical code 20 is wound around the excess length organizing holders 10a–10e provided on the mounting hardware 120 in accordance with the length to be organized, and held by holders 128 as required. It is to be noted that although the holders 128 are shown only at two places in the example shown in FIG. 2, they can be provided elsewhere on the mounting hardware 120 as required.

Figure 3A:
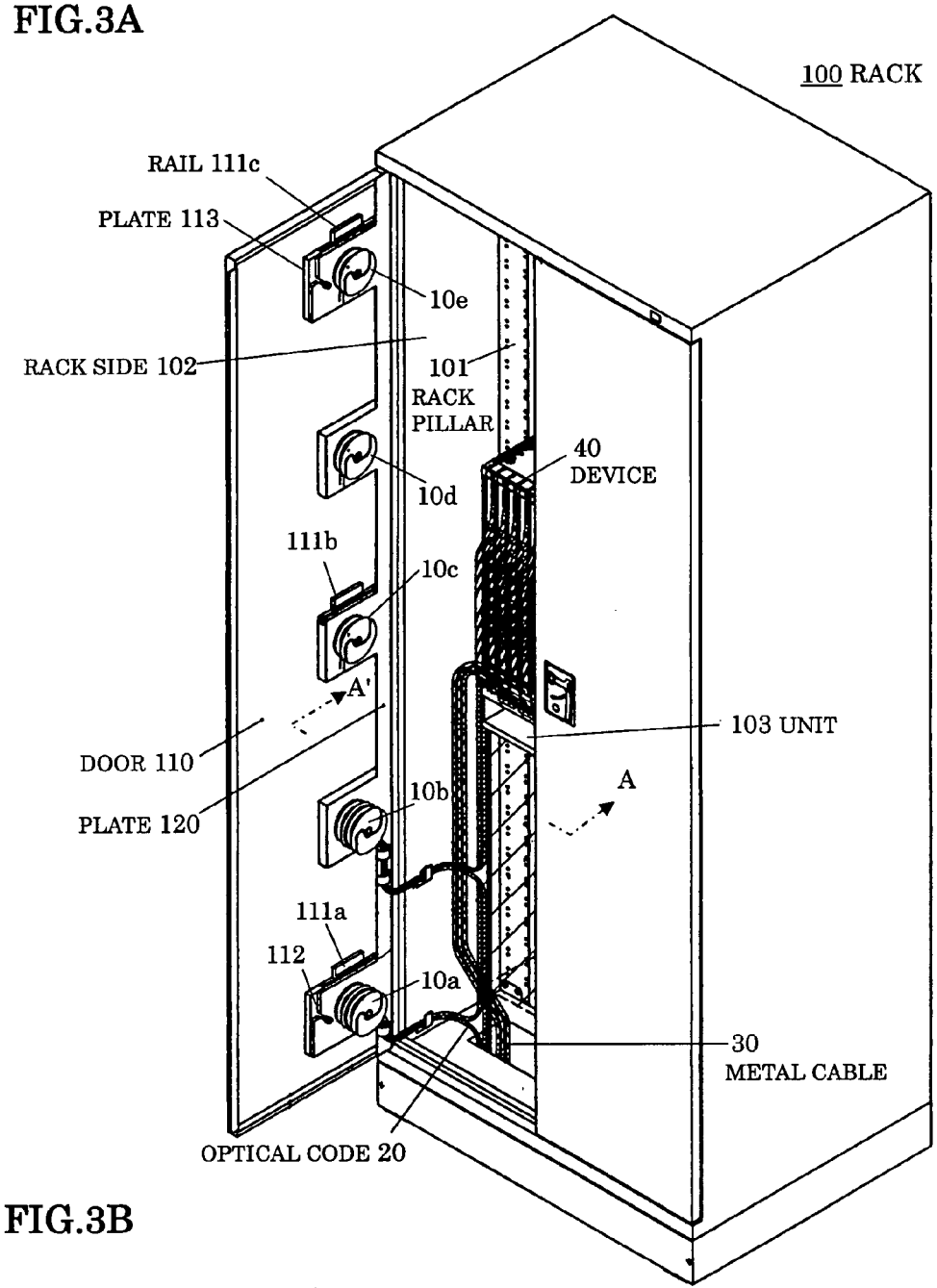
FIGS. 3A and 3B are diagrams showing a state after assembling a rack 100 shown in FIG. 2.
Figure 3B:
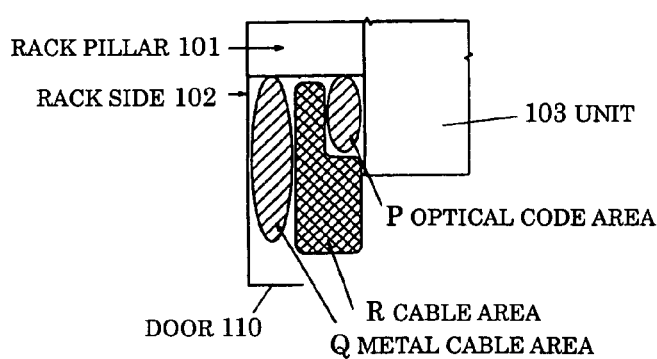

FIGS. 3A and 3B show a state after assembling the excess length organizing structure shown in FIG. 2. FIG. 3A shows a perspective view of the rack 100 in a state where the door 110 is open, while FIG. 3B shows a sectional view along a line A–A' shown in FIG. 3A.

As shown in FIG. 3B, in an area provided between the rack side 102 and the unit 103 sandwiching the rack pillar 101, a surplus of a cable area R can be secured in addition to an optical code are P for accommodating the optical code 20 and a metal cable area Q for accommodating the metal cable 30.

This cable area R corresponds to the combination of the work area X for organizing optical code's excess length and the organizing area Y of the optical code's excess length, so that more cables can be accommodated in the rack 100 compared to the conventional structure, thereby enabling larger number of devices 40 to be mounted on the rack 100 within the permissibility of the circuitry function.

Also, since the excess length organizing holders shown in FIGS. 1A–1C are used, the excess length organizing operation is facilitated. Moreover, since the door 110 can be easily detached and the mounting hardware 120 can freely rotate, a sufficient work area in front of the rack 100 can be secured at the time of excess length organizing operation, thereby further facilitating the excess length organizing operation.

What is claimed is:

1. An excess length organizing holder comprising:
    a baseboard which has a rotation axis vertical to a fixed plane; and
    a spool which has a flange whose edge is provided with two incisions and a winding portion, and rotates around the rotation axis in a state where a cable is folded by way of the winding portion and the two incisions, thereby winding the cable twofold around the winding portion;
    wherein a guide channel is provided on a surface of the flange so as to connect the two incisions.

2. The excess length organizing holder as claimed in claim 1, wherein the guide channel is curved so that in combination with the winding portion, equal to or more than a predetermined bend radius is maintained for the cable as folded.

3. The excess length organizing holder as claimed in claim 1, wherein the baseboard is provided with fixing means which fix the baseboard to a desired fixing position.

4. An excess length organizing holder comprising:
    a baseboard which has a rotation axis vertical to a fixed plane;
    a spool which has a flange whose edge is provided with two incisions and a winding portion, and rotates around the rotation axis in a state where a cable is folded by way of the winding portion and the two incisions, thereby winding the cable twofold around the winding portion; and
    anti-reverse rotation means which stops a rotation in a reverse direction to a winding direction of the spool.

5. The excess length organizing holder as claimed in claim 4, wherein the anti-reverse rotation means comprise a salient rotation stopper provided on one of contacting surfaces between the spool and the baseboard and a rotation stopper catching slot provided on the other surface.

6. A multistage excess length organizing holder comprising:
    a plurality of excess length organizing holders,
    each of the excess length organizing holders comprises a baseboard which has a rotation axis vertical to a fixed plane, and a spool which has a flange whose edge is provided with two incisions and a winding portion, and rotates around the rotation axis in state where a cable is folded by way of the winding portion and the two incisions, thereby winding the cable twofold around the winding portion, and
    one of the excess length organizing holders being made a primary holder, and the other excess length organizing holders being made extension holders, whereby at least one of the extension holders is connected to the primary holder with connecting means so that the rotation axes of the extension holders are fixed on a same axis as the rotation axis of the primary holder.

7. The multistage excess length organizing holder as claimed in claim 6, wherein the connecting means comprise a combination of a ridged axis provided on each of the baseboards and a slotted bearing that fits the ridged axis.

8. The multistage excess length organizing holder as claimed in claim 6, wherein the baseboard of the primary holder has fixing means which fix the baseboard to a desired fixing position.

9. An excess length organizing structure comprising:
    a door detachable from a box-shaped rack;
    a mounting hardware which connects the door to the rack and pivots on one side so as to make the door openable and closable; and
    at least one excess length organizing holder, comprising a baseboard which has a rotation axis vertical to a fixed plane, and a spool which has a flange whose edge is provided with two incisions and a winding portion, and rotates around the rotation axis in a state where a cable is folded by way of the winding portion and the two incisions, thereby winding the cable twofold around the winding portion;
    the baseboard of the excess length organizing holder is attached on a surface of the door when the door is attached to the mounting hardware.

10. The excess length organizing structure as claimed in claim 9, wherein the door has a rail and a projection, and the mounting hardware has a rail groove fitting the rail and a slantly formed depressed groove enabling the projection to slide, so that the door is attached to the rack by sliding down the projection slantly along the depressed groove.

* * * * *